W. H. RICE, DEC'D.
J. E. RICE, ADMINISTRATOR.
SEPARATOR FOR POTATO DIGGERS.
APPLICATION FILED MAY 13, 1914.
1,263,114.
Patented Apr. 16, 1918.
3 SHEETS—SHEET 1.
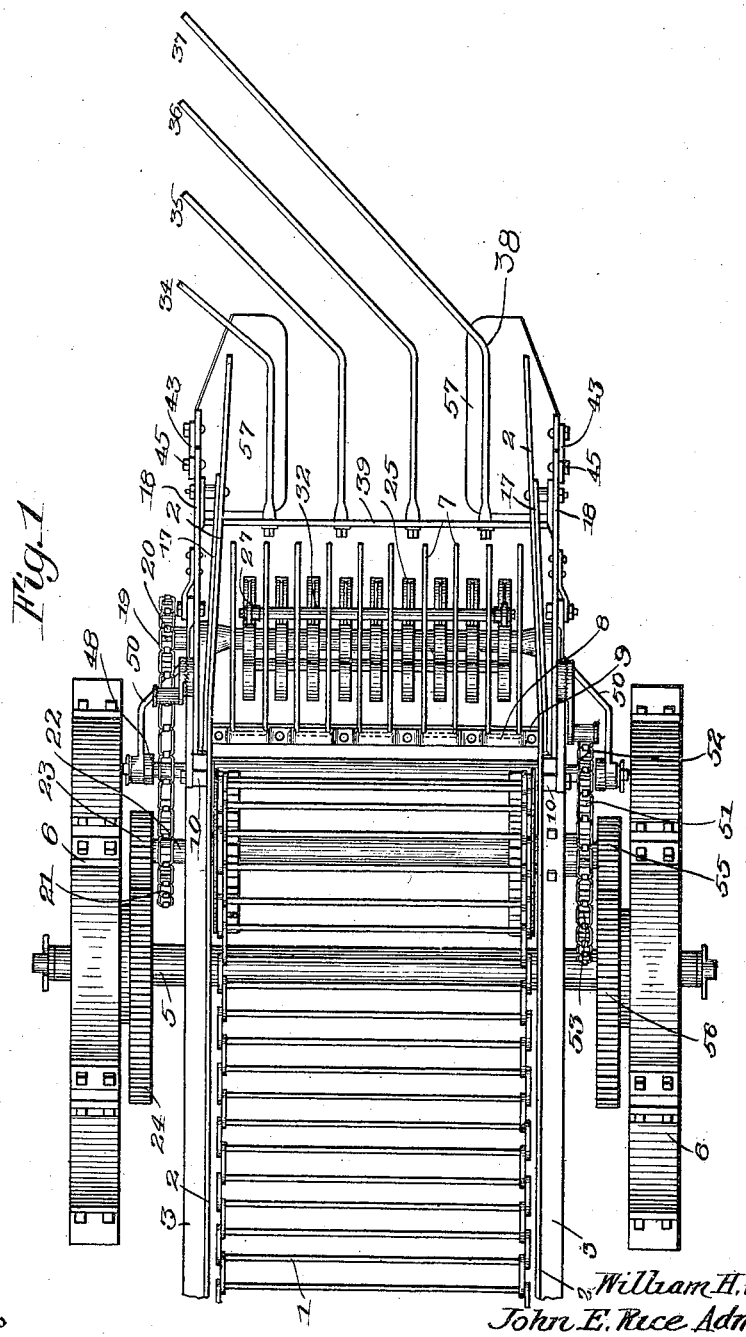

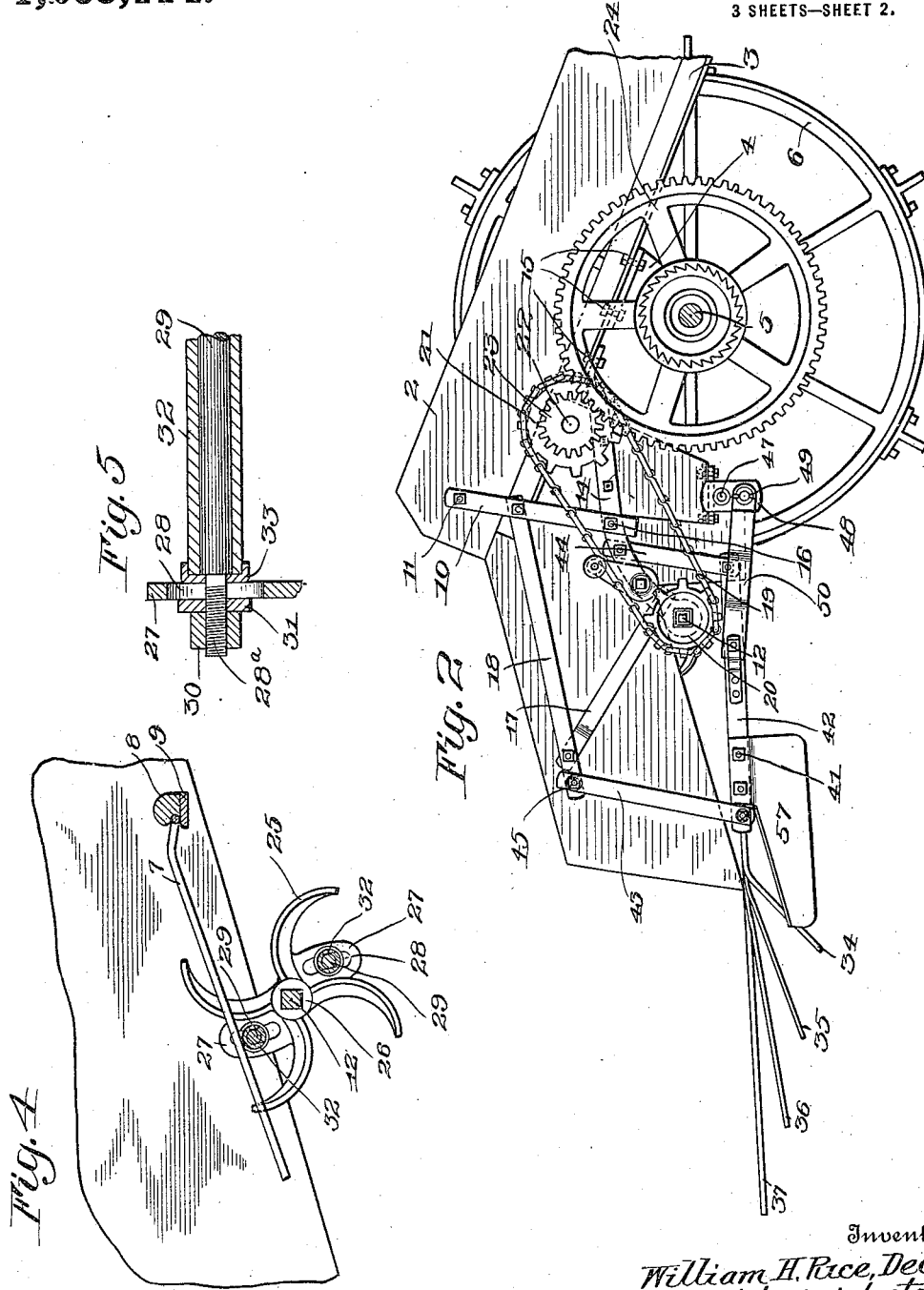

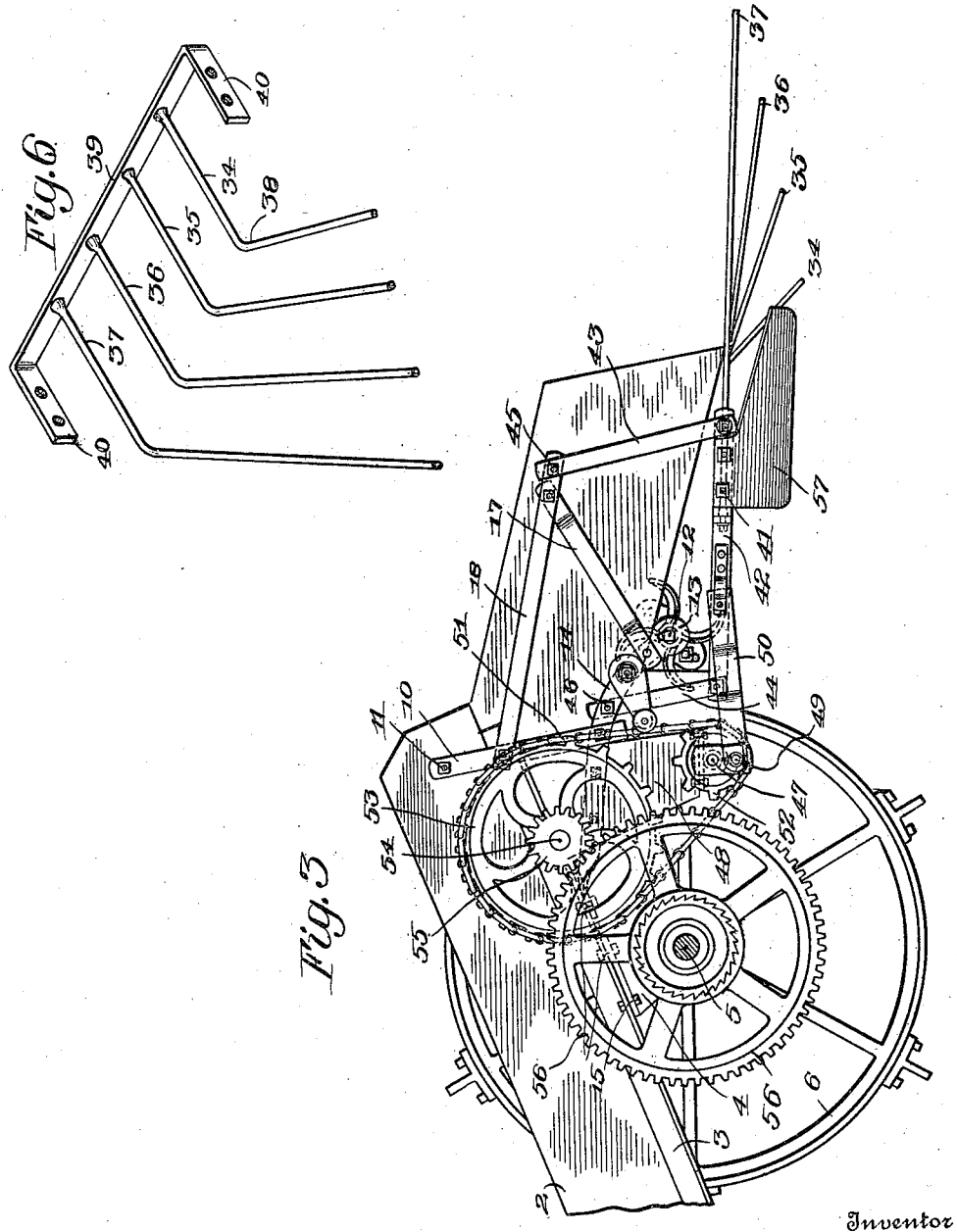

UNITED STATES PATENT OFFICE.

WILLIAM H. RICE, DECEASED, LATE OF ROCHESTER, NEW YORK, BY JOHN E. RICE, ADMINISTRATOR, OF ROCHESTER, NEW YORK.

SEPARATOR FOR POTATO-DIGGERS.

1,263,114.   Specification of Letters Patent.   Patented Apr. 16, 1918.

Application filed May 18, 1914. Serial No. 839,432.

*To all whom it may concern:*

Be it known that I, JOHN E. RICE, of Rochester, in the county of Monroe, State of New York, administrator of WILLIAM H. RICE, late a citizen of the United States and a resident of Rochester, in the county of Monroe and State of New York, deceased, believe that the said WILLIAM H. RICE invented a new and useful Improvement in Separators for Potato-Diggers, which improvement is fully set forth in the following specification and shown in the accompanying drawings.

The present invention relates to potato diggers of the type in which an endless elevator receives the vines, potatoes and dirt from a shovel or other excavating means and after separating some of the dirt, delivers the vines with the potatoes to a suitable runway in which the lumps of dirt are broken up and disconnected from the vines and potatoes and an object of this invention is to improve the construction of the mechanism which separates the dirt from the vines and the potatoes. Another object of the invention is to combine with the dirt or lump breaking and separating means, a separator which receives the vines and the potatoes and removes the latter from the vines which are finally discharged from the machine, preferably at one side of the latter.

To these and other ends the invention consists in certain parts and combinations of parts all of which will be hereinafter described, the novel features being pointed out in the appended claims.

In the drawings:

Figure 1 is a plan view of the rear portion of a potato digger embodying the present invention;

Figs. 2 and 3 are side elevations of opposite sides of the potato digger with the nearer wheel removed;

Fig. 4 is a detail view showing the coöperation between the beater and the vibrating fingers of the lump breaking and separating means;

Fig. 5 is a sectional view through an end portion of one of the rollers on the beater, showing the connection of the roller with the beater which is also shown in section; and Fig. 6 is a perspective view of the fine separating and discharging frame.

In the illustrated embodiment of the invention, 1 indicates the endless separator and elevator which is usually supported between two side frames 2 arranged on angle bars 3, the latter carrying brackets 4 on which the shaft or axle 5 for the ground wheels 6 is journaled, the wheels being secured to the shaft to turn therewith.

Arranged at the rear of the elevator and separator, is a mechanism which breaks up and separates the large lumps of dirt from the vines and potatoes discharged by the elevator and separator 1. This mechanism preferably embodies oscillating fingers 7, every two of which are formed from a single piece of metallic rod bent in U-shaped form and having its connecting portion 8 pivotally secured to a cross or transversely extending bar 9 which is supported from the ends of two depending members 10 bolted or otherwise secured at 11 to the side piece 2. Coöperating with the vibrating fingers 7 is a rotary beater which has its shaft 12 journaled in the castings 13 arranged at the free ends of bracket arms 14 bolted at 15 to the angle bars 3, said arms extending rearwardly and downwardly from those portions of the angle bars 3 above the axle 5, intermediate portions of the bracket arms 14 being bolted at 16 to the depending supports 10 in order that the supports and the bracket arms 14 will brace each other. The bracket arms 14 are further braced by rearwardly and upwardly extending members 17 which connect with rearwardly and downwardly extending members 18 which extend rearwardly from the supports 10. The shaft 12 is driven in any suitable manner, as, for instance, by a chain 19 which passes about a sprocket 20 on the shaft 12 and also about a sprocket 21 on a stub shaft 22 which also has arranged thereon a gear 23 meshing with a large gear 24 on the shaft 5 on the ground wheel 6.

The beater may be in the form of a plurality of castings rigidly secured to the shaft 12 in axial alinement and each having a plurality of curved fingers 25 arranged to operate between two of the vibrating arms or fingers 7 to displace material supported by said fingers and also to carry such material to the rear or free ends of the fingers.

The vibration of the fingers may be obtained by providing eccentrically arranged portions on the beater between the fingers of the latter in order to engage the under side of the vibrating arms or fingers 7 and thus elevate the latter at intervals. In this instance, the two end beater castings 26, from which the fingers 25 project, are provided on opposite sides between the fingers 25 with the projections 27 formed with arcuate slots or guides 28. A bar or shaft 29 having reduced ends 28ª connects the two end castings 26 and is held in its adjusted position within slots of the two end castings by nuts 30 on the reduced ends 28ª, washers 31 being interposed between the nuts and the outer faces of the projections. The shaft 29 is surrounded by a tube or roller, and cup-shaped washers 33 are interposed between the inner faces of the projections 27 and the shoulders formed by the reduced ends of the shaft 29; the tube or roller 32 projecting into the cup-shaped washers 33 and, in this way, preventing vines entering between the ends of the roller and the proximate parts. The roller is provided in order that vines will not be caught by the eccentrically-arranged, longitudinally-extending member and thus be wound upon the beater. This roller also prevents the packing of wet clay between the adjustable longitudinal-extending member and the hubs of the beater members as it would if this roller member did not rotate. The rotatable longitudinally-extending member also is not subjected to so much wear as it would otherwise be.

An important feature of this invention is the breaking up of the lumps of dirt before presenting the mass to a vine separator arranged in rear of the separator for the dirt. This vine separator embodies a plurality of rearwardly extending arms or fingers 34, 35, 36 and 37 separated at a distance apart greater than the swinging fingers 7 and receiving the vines and potatoes from such swinging fingers 7. These arms are of different lengths, the arm 34 being the shortest and the others gradually increasing in length toward the arm 37 which is the longest. At 38, the arms are provided with lateral bends deflecting them at their ends toward one side of the machine. Some of the arms are also deflected downwardly so that the end of the shortest arm 34 is lowest while the ends of the others gradually and successively rise.

Preferably the arms extend rearwardly from a cross piece 39 which has laterally turned portions 40 bolted at 41 to frame bars 42 lying parallel with each other and supported by swinging links 43 and 44, the forward one of which is shorter than the rear one, and the links being pivoted at 45 and 46 respectively to the members 18 and the bracket arms 14.

The links 43 and 44 permit the vine separator and turner to be given a shaking or reciprocating movement and this movement may be effected from a shaft 47 supported from the bracket arm 14 by means of depending brackets 48, said shaft having eccentrically arranged wrist pins 49 connected by pitmen 50 to the side members 42 of the reciprocating vine separator. The shaft 47 may be driven by a sprocket chain 51 passing about a sprocket wheel 52 on the shaft 47 and also about a sprocket wheel 53 on the stub shaft 54 which is journaled on one of the angle pieces 3, said shaft carrying a gear 55 which meshes with the gear 56 arranged on the shaft 5 so that the movement of the machine effects the movement of the vine separator.

Preferably carried by the vine separator are two potato gatherers in the form of depending plates converging toward their lower edges and secured by the bolts 41 to the frame of the vine separator. Side plates 42 may be arranged to confine the mass on the fingers 7 and the fingers 34 to 37 forming a runway from the endless elevator to the vine separator and turner.

The operation of this invention is as follows: The potatoes are excavated in any suitable manner and delivered onto the endless separator and elevator 1 which carries them upwardly and separates the fine stones and dirt from the vines, potatoes and other large material. When this material reaches the rear end of the endless separator, it drops upon the rearwardly extending vibrating fingers 7 which are raised and lowered by the engagement and disengagement of the longitudinally extending rollers 32 on the beater. At the same time, the fingers 25 on the beater operate between the rearwardly extending and vibrating fingers 7 and agitate the mass to break up the lumps of dirt and disconnect the potatoes from the vines, the distances between the fingers 7 being such that the potatoes and vines are still held by such fingers 7. The latter then deposit the potatoes and vines to the vibrating or reciprocating vine separator, the openings of which are great enough to permit the potatoes to drop therethrough and to be caught by the gathering blades 57 so as to be deposited or gathered into a line. The vines are then carried rearwardly by the rods or fingers 34 to 37 and deposited to one side of the line of potatoes, this being due to the deflection of the rear ends of the fingers 34 to 37.

From the foregoing, it will be seen that there has been provided a rotary beater having longitudinally extending rollers which coöperate with the swinging fingers of the dirt separator in such a manner that vines cannot be caught by such rollers and wound about the beater shaft. These rollers also prevent the packing of clay between the rollers and the beater shaft and also are not subjected to much wear. There has also been provided between the vine separator and the endless elevator, a separator for breaking up the dirt that is clinging to the vine and potatoes so that the vine separator has only to separate the potatoes from the vines.

What is claimed as the invention and desired to be secured by Letters Patent is:

1. In a potato digger, the combination with an elevating means, of separating means embodying a plurality of pivoted fingers receiving material from the elevating means, and a rotary beater arranged below the fingers and having portions movable between the fingers to operate on the material on the said fingers, and a roller eccentrically carried by the beater and adapted to engage the fingers to move them on their pivots for the purpose of vibrating them.

2. In a potato digger, the combination with an elevating means, of a separating means embodying a plurality of rearwardly extending fingers receiving material from the elevating means, a beater arranged below the fingers and having fingers operating between the pivoted fingers to shift the material rearwardly on said pivoted fingers, and a roller extending longitudinally of the beater between fingers of the latter and eccentrically to the axis of rotation of said beater.

3. In a potato digger, the combination with an elevating means, of a separating means embodying a plurality of rearwardly extending fingers receiving material from the elevating means, a beater arranged below the pivoted fingers and having fingers operating between said pivoted fingers, and a roller extending longitudinally of the beater between the fingers of the latter, said roller being adjustable toward and from the axis of the beater.

4. In a potato digger, the combination with an elevating means, of a separating means embodying a plurality of rearwardly extending fingers receiving material from the elevating means, a beater arranged below the pivoted fingers and having fingers operating between the pivoted fingers, slotted guides at the ends of the beater, a shaft having reduced ends working in the guides, cup-shaped washers abutting the shoulders formed by such reduced ends, and a roller surrounding the shaft and fitting at its ends in the cup-shaped washers.

JOHN E. RICE,
*Administrator of William H. Rice, dec'd.*

Witnesses:
HAROLD H. SIMMS,
ADA M. WHITMORE.

Copies of this patent may be obtained for five cents each, by addressing the "Commissioner of Patents, Washington, D. C."